T. LUMSDEN.
TOOL HOLDER FOR TOOL AND LIKE GRINDING MACHINES.
APPLICATION FILED FEB. 8, 1911.
1,047,424.
Patented Dec. 17, 1912.
2 SHEETS—SHEET 2.
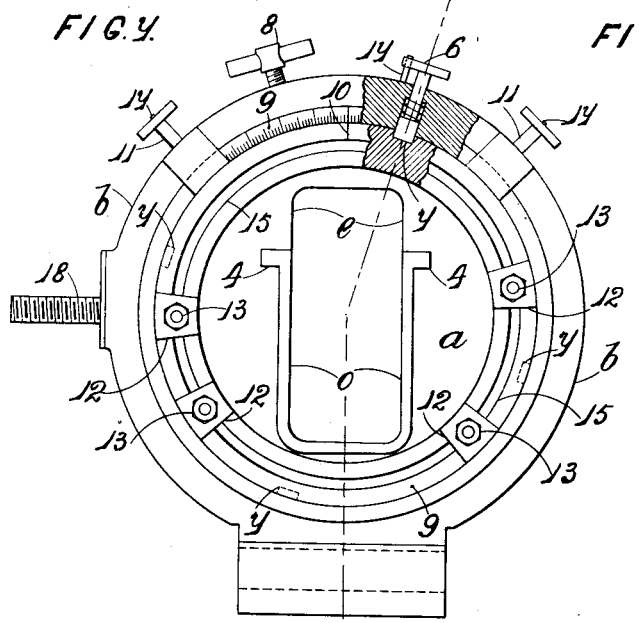
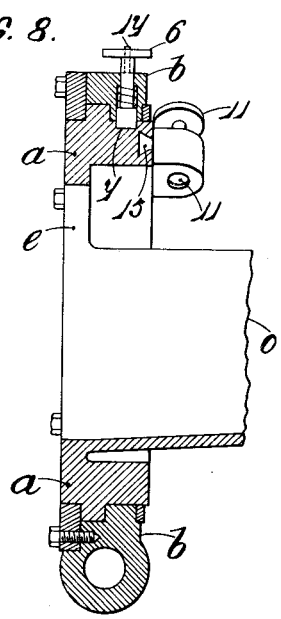
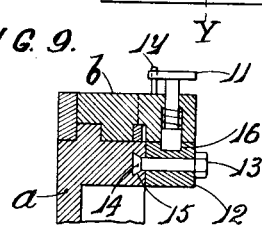
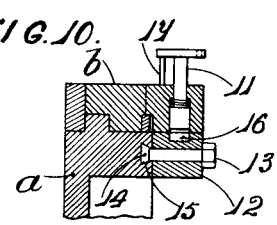
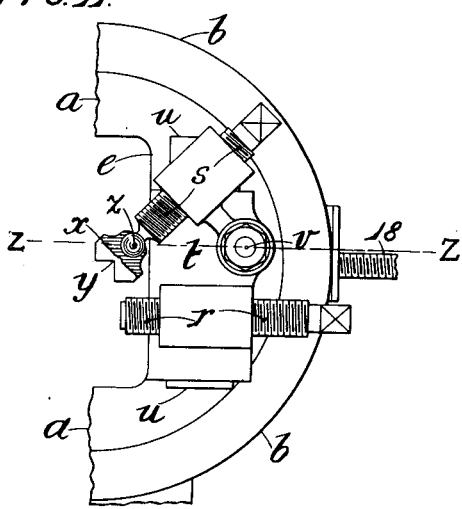
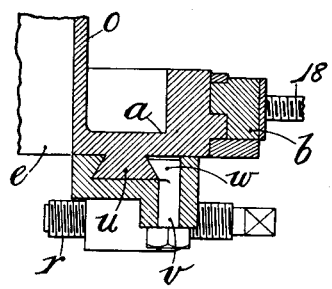
WITNESSES:
John C. Sanders
John A. Percival
INVENTOR
Thomas Lumsden
BY
ATT'Y.

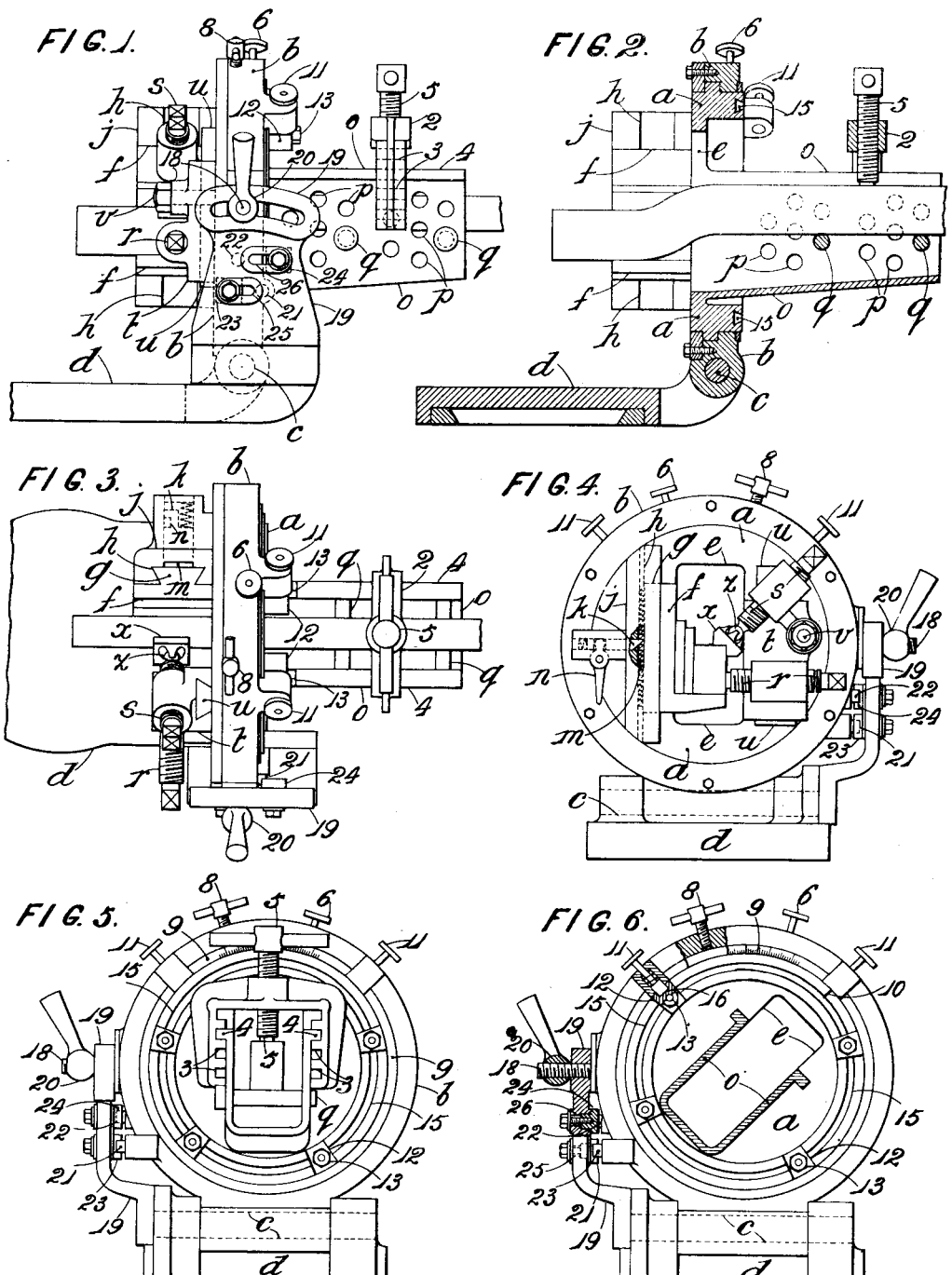

UNITED STATES PATENT OFFICE.

THOMAS LUMSDEN, OF GATESHEAD, ENGLAND.

TOOL-HOLDER FOR TOOL AND LIKE GRINDING MACHINES.

1,047,424.　　　　　Specification of Letters Patent.　　Patented Dec. 17, 1912.

Application filed February 8, 1911. Serial No. 607,364.

*To all whom it may concern:*

Be it known that I, THOMAS LUMSDEN, a subject of the King of Great Britain and Ireland, and a resident of Gateshead, in the county of Durham, England, have invented certain new and useful Improvements in Tool-Holders for Tool and Like Grinding Machines, of which the following is a specification.

This invention relates to tool holders for machines for grinding the tools of lathes, slotting, shaping, planing and like machines, and has for its object to provide an improved holder which will secure the tool firmly during the grinding or sharpening operation, and which will be readily adjustable to suit different sizes and angular faces of tools.

I will fully describe my invention with reference to the accompanying drawings wherein—

Figure 1 is a side elevation of my improved tool holder, Fig. 2 a longitudinal section of same, and Fig. 3 a plan of Fig. 1. Fig. 4 is a front view, Fig. 5 a rear view, and Fig. 6 a rear view partly in section. Fig. 7 is an enlarged rear view of the main part of the holder, and Fig. 8 a section on the line X—Y therein. Figs. 9 and 10 are part sectional views illustrating an adjustable stop for setting and re-setting the tool holder to various positions as hereinafter described, Fig. 11 is an enlarged part front view of the main part of the holder, and Fig. 12 is a sectional plan of same on the line Z—Z.

Referring to the drawings $a$ is a frame or disk mounted and angularly adjustable within a carrier $b$ articulated at $c$ to a turn-table $d$ which is mounted and angularly adjustable on a compound slide (not shown) in the known way.

$e$ is an opening in the frame or disk $a$, and $f$ is an adjustable bracket for supporting the front end of the tool to be ground and having a dove-tail guide $g$ (Figs. 3 and 4) sliding in a corresponding groove $h$ in a projection $j$ on the front of the frame or disk $a$. The bracket $f$ is retained in the desired position by a spring-pressed catch $k$ engaging ratchet teeth $m$ on the guide $g$, said catch being adapted to be retracted from engagement with the teeth $m$ by a trigger $n$ to allow of the adjustment of the bracket $f$. The rear end of the frame or disk $a$ is furnished with a trough-like extension $o$, the side walls of which are provided with two series of holes $p$—$p$ at different levels for the reception of pins $q$—$q$ which form an adjustable support for the rear end of the tool.

The front end of the tool is clamped in position on the bracket $f$ by screw clamps $r$, $s$ carried by a saddle $t$ sliding on a guide $u$ on the front face of the frame or disk $a$ and adapted to be retained in the desired position by a bolt $v$ having a head $w$ (Fig. 12) engaging the guide $u$. The clamping screw $r$ bears against the side of the tool, and the clamping screw $s$ is arranged at an angle and furnished with a head $x$ having a V-shaped notch $y$ (Fig. 11) for engaging the corners of rectangular tools as shown in Figs. 3 and 4. The head $x$ is secured to the clamping screw $s$ by a ball universal-joint $z$ so that the head may be capable of limited movement relatively to the screw and so adjust or adapt itself should the saddle $t$ not be adjusted to quite the correct position.

The rear end of the tool is clamped in position on the pins $q$, $q$ by a clamp comprising a bridle 2 having notches 3 for engaging flanges 4 on the side walls of the trough-like extension $o$ and a clamping screw 5. The bridle 2 is furnished with several notches 3 for the purpose of rendering it adjustable to various sizes of tools.

When a cranked tool is to be placed in the holder the bracket $f$ and pins $q$, $q$ are adjusted to suit the front and rear ends of the tool, and on the latter being placed in position on the bracket $f$ and pins $q$, $q$ the front and rear ends are clamped by the screw clamps $r$ and $s$ and the bridle 2 and clamping screw 5 as above described and shown in Figs. 1 to 5. When a straight or uncranked tool is to be placed in the holder the bracket $f$ and pins $q$, $q$ are adjusted to the same heights or levels and the tool is placed in position thereon and secured as described.

In order to hold tools at various angles for the purpose of grinding angular faces, the frame or disk $a$ is angularly adjustable within the carriage $b$. For adjusting the frame or disk $a$ at right angles within the carrier $b$ the latter is furnished with a spring-pressed plunger 6 adapted to engage recesses 7—7 (Figs. 7 and 8) provided in the periphery of the frame or disk $a$ at intervals of 90°, and when adjusted the frame or disk is locked by the plunger 6 and a clamping screw 8. For adjusting the frame or disk *a* at other angles than right angles the carrier *b* is provided at the rear with a protractor or scale 9 and the frame or disk *a* with a mark 10. To adjust the frame or disk *a* the latter is rotated until the mark 10 coincides with the required angle on the scale or protractor 9 and then clamped by the screw 8.

To enable the frame or disk *a*, after being adjusted to any angle other than a right angle, to be moved from such angle and readily readjusted or brought back to same, spring plungers 11, 11 are provided on the carrier *b* and are adapted to co-act with adjustable stops 12—12 mounted on bolts 13—13 having dovetail heads 14 (Figs. 9 and 10) sliding in a complementary groove 15 in the frame or disk *a*. After the frame or disk *a* has been adjusted to the required angle, one of the stops 12 is adjusted into alinement with one of the plungers 11 as shown in Fig. 6. The plunger engages a recess 16 in the stop which is then locked by its bolt 13, and on the frame or disk being adjusted to some other angle it can be readily brought back to its former angle by rotating it until the stop aforesaid comes into alinement with and is engaged by the plunger. By providing more than one plunger 11 and several stops 12 the frame or disk *a* can after being adjusted to several different angles be readily re-adjusted to any of them.

In order to hold the spring plungers 6 and 11, 11 in the in-operative position I combine with the head of each, as shown in Figs. 7, 8, 9 and 10, a stem 17 which, when the plunger is in action passes through a hole in the head. When the plunger is retracted it can be held out of action by rotating it so that the hole in the head is moved out of alinement with the stem 17 which then retains the plunger in its retracted position as shown in Fig. 10.

For clamping the carrier *b* when adjusted about its pivot *c* the carrier is furnished with a screwed projection 18 passing through a slotted quadrant plate 19 and provided with a clamping nut 20. The adjustment of the carrier about its pivot *c* may be limited by pins 21, 22 adapted to engage blocks 23, 24 adjustable in slots 25, 26 in the quadrant plate 19 as shown in Figs. 1, 4, 5 and 6.

What I claim and desire to secure by Letters Patent is:—

1. In tool holders for tool and like grinding machines the combination of a carrier, a frame or disk mounted in said carrier and angularly adjustable therein, an adjustable bracket mounted and sliding on the front face of said frame or disk, means for adjusting said bracket and locking it in the adjusted position, and means for clamping the tool thereon.

2. In tool holders for tool and like grinding machines the combination of a carrier, a frame or disk mounted in said carrier and angularly adjustable therein, an adjustable bracket mounted and sliding on the front face of said frame or disk, a spring-pressed catch for adjusting said bracket and locking it in the adjusted position, and a trigger for releasing said catch.

3. In tool holders for tool and like grinding machines the combination with an adjustable support for the tool and means for adjusting said support and locking it in the adjusted position, of an adjustable saddle, means for adjusting said saddle and locking it in the adjusted position, and screw clamps on said saddle for clamping the tool on said support.

4. In tool holders for tool and like grinding machines the combination with a support for the tool of an adjustable saddle, means for adjusting said saddle and locking it in the adjusted position, and screw clamps on said saddle for clamping the tool on said support, one of said clamps being arranged obliquely or at an angle and furnished with a V-shaped clamping head attached by a universal joint.

5. In tool holders for tool and like grinding machines the combination of a carrier, a frame or disk mounted in said carrier and angularly adjustable therein, an adjustable support mounted on said frame or disk for supporting the front end of the tool, means for adjusting said support, an adjustable saddle mounted and sliding on the front of said frame or disk, means for adjusting said saddle and locking it in the adjusted position, and screw clamps on said saddle for clamping the tool on said support.

6. In tool holders for tools and like grinding machines the combination of a carrier, a frame or disk mounted in said carrier and angularly adjustable therein, an adjustable bracket mounted and sliding on said frame or disk, means for locking said bracket in the adjusted position, an adjustable saddle mounted and sliding on said frame or disk, and screw clamps on said saddle one of said screw clamps being arranged obliquely or at an angle and furnished with a clamping head attached by a universal joint and provided with a V-shaped notch.

7. In tool holders for tool and like grinding machines the combination of a carrier, a frame or disk mounted in said carrier and angularly adjusted therein, a support on and at one side of said frame or disk for supporting the front end of the tool, an adjustable support on and at the other side of said frame or disk for supporting the rear end of the tool, and means for clamping the tool on said supports.

8. In tool holders for tool and like grinding machines the combination of a carrier, a frame or disk mounted in said carrier and angularly adjustable therein, an adjustable support on and at one side of said frame or disk for supporting the front end of the tool, means for clamping the tool thereon, an adjustable support on and at the other side of said frame or disk for supporting the rear end of the tool, and means for clamping the tool thereon.

9. In tool holders for tool and like grinding machines the combination of a carrier, a frame or disk mounted in said carrier and angularly adjustable therein, a support on and at one side of said frame or disk for supporting the rear end of the tool, and adjustable support on and at the other side of said frame or disk for supporting the front end of the tool, and means for clamping the tool on said supports.

10. In tool holders for tool and like grinding machines the combination of a carrier, a frame or disk mounted in said carrier and angularly adjustable therein and provided with an opening, an adjustable support on one side of said frame or disk, means for clamping one end of the tool on said support, a trough-like extension on the other side of said frame or disk, graduated holes in the sides or walls of said extension, pins adapted to be inserted in said holes and to support the other end of the tool, and means for clamping the tool on said pins.

11. In tool holders for tool and like grinding machines the combination of a carrier, a frame or disk mounted in said carrier and angularly adjustable therein and provided with an opening, an adjustable bracket mounted and sliding on one side of said frame or disk, means for clamping one end of the tool on said bracket, a trough-like extension on the other side of said frame or disk, graduated holes in the sides or walls of said extension, pins adapted to be inserted in said holes and to support the other end of the tool, and means for clamping the tool on said pins.

12. In tool holders for tool and like grinding machines the combination of a carrier, a frame or disk mounted in said carrier and angularly adjustable therein and provided with an opening, an adjustable bracket mounted and sliding on one side of said frame or disk, an adjustable saddle mounted and sliding on said frame or disk, screw clamps on saddle for clamping one end of the tool on said bracket, a trough-like extension on the other side of said frame or disk, graduated holes in the sides or walls of said extension, pins adapted to be inserted in said holes and to support the other end of the tool, and means for clamping the tool on said pins.

13. In tool holders for tool and like grinding machines the combination of a carrier, a frame or disk mounted in said carrier and angularly adjustable therein, a trough-like extension on said frame or disk, graduated holes in the walls or sides of said extension, pins adapted to be inserted in said holes and to support the tool, and a clamping device for clamping the tool in position on said pins, said clamping device comprising an adjustable bridle provided with notches to engage projections on said extension and a clamping screw mounted in said bridle.

14. In tool holders for tool and like grinding machines the combination of a carrier, a frame or disk mounted in said carrier and angularly adjustable therein, an opening in said frame or disk, an adjustable bracket mounted and sliding on one side of said frame or disk, means for locking said bracket, an adjustable saddle mounted and sliding on said frame or disk, means for locking said saddle, screw clamps carried by said saddle, a trough-like extension on the other side of said frame or disk, holes in the side walls of said extension, pins adapted to be inserted in said holes, and an adjustable clamp comprising an adjustable bridle adapted to engage said extension and a clamping screw mounted in said bridle.

15. In tool holders for tool and like grinding machines the combination of a carrier, a frame or disk mounted in said carrier and angularly adjustable therein, and opening in said frame or disk, an adjustable support on each side of said frame or disk, a spring plunger on said carrier adapted to co-act with recesses arranged at definite angles in said frame or disk, spring plungers on said carrier, and stops mounted and angularly adjustable on said frame or disk and adapted to co-act with said spring plungers.

In witness whereof I have hereunto signed my name in the presence of two subscribing witnesses.

THOMAS LUMSDEN.

Witnesses:
 EDMUND WARD PATTISON,
 HERBERT HOWARD.